J. W. PRICE.
GATE.
APPLICATION FILED MAY 25, 1908.
907,873.
Patented Dec. 29, 1908.
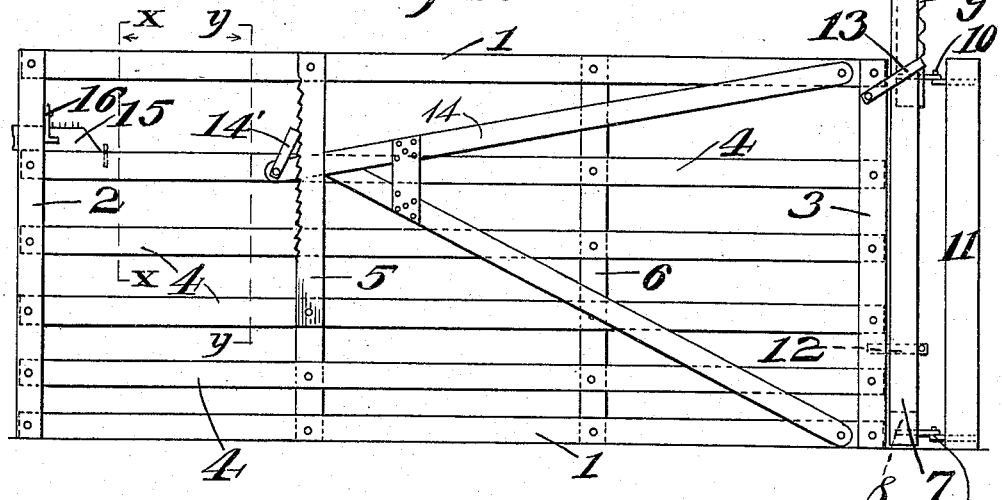
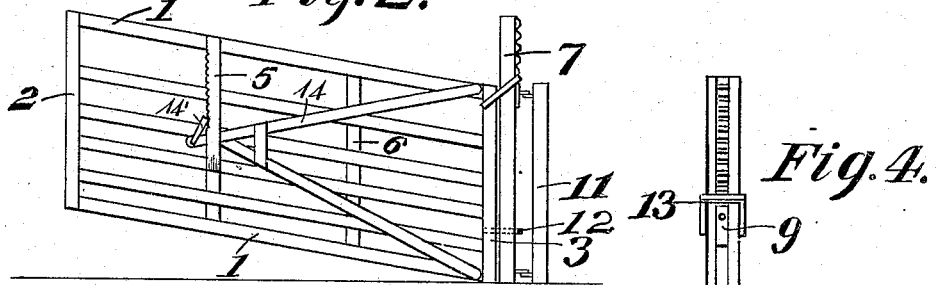
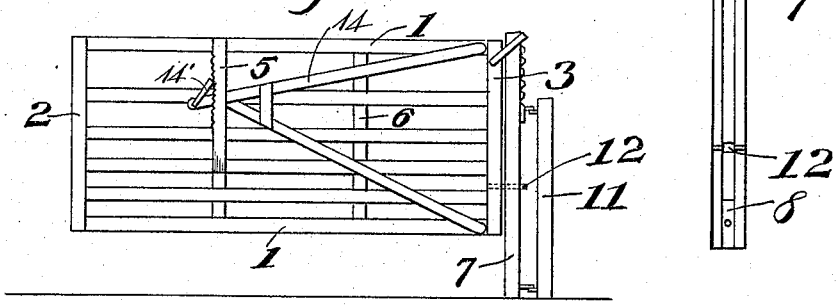
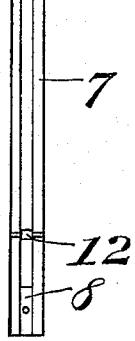
Witnesses
E. S. Brown
C. H. Griesbauer
Inventor
James W. Price.
By H. B. Willson & Co
Attorneys

UNITED STATES PATENT OFFICE.

JAMES W. PRICE, OF COVINGTON, INDIANA.

GATE.

No. 907,873.     Specification of Letters Patent.     Patented Dec. 29, 1908.

Application filed May 25, 1908. Serial No. 434,827.

*To all whom it may concern:*

Be it known that I, JAMES W. PRICE, a citizen of the United States, residing at Covington, in the county of Fountain and State of Indiana, have invented certain new and useful Improvements in Gates; and I do declare the following to be a full, clear, and exact description of the invention, such as will enable others skilled in the art to which it appertains to make and use the same.

My invention relates to certain improvements in gates, more particularly farm gates.

It has for its objects to provide for the adjustment of the gate pivotally or angularly with relation to the ground or surface for convenience for the passage of small stock thereunder, and for other purposes, as convenience and expedition may suggest. Also, to carry out the aforesaid ends in a simple, economic and effective manner.

With these and other objects in view, the invention consists of certain novel features of construction, combination and arrangement of parts as will be more fully described and particularly pointed out in the appended claim.

In the accompanying drawings, illustrating the preferred embodiment of my invention, Figure 1 is a side elevation thereof; Figs. 2 and 3 are like views thereof with the gate angularly adjusted and bodily adjusted with relation to the surface or ground, respectively; Fig. 4 is a rear elevation of the gate.

In carrying out my invention I construct the gate, 1, preferably of top and bottom bars, 1, end bars, 2 and 3, intermediate horizontal bars, 4, vertical or transverse bars, 5 and 6, all of which are pivotally connected together in any suitable way. Said gate has applied to its rear end a hanger member, 7, comprising parallel vertical bars having secured between their lower and upper ends a block, 8, and a rack bar, 9, respectively. Secured to the block and rack are the eye members of a hinge connection 10, the pin members thereof being carried by the hinge post 11. Said gate has its rear end member 3 provided with a bar or guide member, 12, having a pin transversely passed therethrough, said guide member extending intermediate of the bars of the hanger member, 7, said cross pin of said guide member extending transversely of said hanger member for the retention of said guide bar in position, so that the lower end of said hanger member will always be flush about with the bottom bar of the gate.

A stirrup or bail-like member, 13, is pivoted to the rear end bars, 3, of the gate and engages with the rack bar, 9, and by means thereof, it will be noted, that the gate may be pivotally adjusted at any desired elevation with relation to the surface or ground for the purpose hereinbefore noted. Also, that by the pivotal connection between the various constituent bars of the gate, it may also be adjusted angularly with relation to the ground or surface, the purpose of which has also been above noted.

Pivotally connected at their rear ends to the top and bottom bars of the gate near the corresponding ends of said latter bars are converging crane members 14, the forward ends of which are connected together the upper one is passed between the gate bars and locking bar, 5, before noted and is equipped with a pawl 14', adapted to engage serrations formed upon the forward edge of said locking bar for effecting the retention of the constituent members of said gate in angular position when the gate is adjusted as last above described, as also for their retention in initial position.

The gate is provided with a suitable latch, 15, suitably adjusted in position by a hook member, 16, pivoted to one of the forward end bars of the gate and to said latch, the purpose of which is apparent.

Various changes in the form, proportion and the minor details of construction may be resorted to without departing from the principle or sacrificing any of the advantages of the invention as defined in the appended claim.

Having thus described my invention, what I claim as new and desire to secure by Letters-Patent, is:

A gate comprising a series of longitudinal and transverse bars pivotally connected together, a transverse rack bar arranged near the forward end of said gate, a crane-like member having its rear ends pivoted to the upper and lower longitudinal bars, a pawl carried by the forward end of said member and adapted to engage said rack bar, a supporting post, a hanger member comprising spaced bars hinged thereto and having arranged between its spaced bars a retaining or guide member, a transverse pin passing through said guide member and resting against the rear of said hanger member, a rack bar secured between the bars of the hanger member at its upper end and a bail or stirrup pivoted to the rear transverse bar of the gate and surrounding said hanger member to engage said rack bar.

In testimony whereof I have hereunto set my hand in presence of two subscribing witnesses.

JAMES W. PRICE.

Witnesses:
N. B. LEIGH,
E. C. ESTER.